United States Patent
Abdelhamid et al.

(10) Patent No.: US 12,101,030 B2
(45) Date of Patent: Sep. 24, 2024

(54) MULTI-LEVEL INVERTING BUCK-BOOST CONVERTER ARCHITECTURE

(71) Applicant: Infineon Technologies Austria AG, Villach (AT)

(72) Inventors: Eslam Abdelhamid, Villach (AT); Juan Sanchez, Villach (AT); Giuseppe Bernacchia, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 22 days.

(21) Appl. No.: 17/563,011

(22) Filed: Dec. 27, 2021

(65) Prior Publication Data

US 2023/0216407 A1 Jul. 6, 2023

(51) Int. Cl.
*H02M 3/158* (2006.01)
*H02M 1/00* (2007.01)

(52) U.S. Cl.
CPC ....... *H02M 3/1582* (2013.01); *H02M 1/0095* (2021.05); *H02M 3/1584* (2013.01)

(58) Field of Classification Search
CPC .... H02M 1/0095; H02M 3/07; H02M 7/4837; H02M 3/158; H02M 3/1582; H02M 3/1584
See application file for complete search history.

(56) References Cited

U.S. PATENT DOCUMENTS

| | | | |
|---|---|---|---|
| 9,407,144 B2 * | 8/2016 | Ozanoglu | H02M 3/1582 |
| 10,547,241 B1 | 1/2020 | Li et al. | |
| 2009/0039852 A1 * | 2/2009 | Fishelov | H02M 3/1582 |
| | | | 323/283 |
| 2012/0262142 A1 * | 10/2012 | Chen | H02M 3/1582 |
| | | | 323/284 |
| 2014/0176103 A1 * | 6/2014 | Huang | H02M 3/1582 |
| | | | 323/283 |
| 2014/0266134 A1 | 9/2014 | Zhak et al. | |
| 2015/0009734 A1 | 1/2015 | Stahl et al. | |
| 2016/0190931 A1 * | 6/2016 | Zhang | H02M 3/1582 |
| | | | 323/271 |
| 2018/0205307 A1 * | 7/2018 | Vukadinovic | H02M 7/4837 |
| 2020/0228014 A1 | 7/2020 | Wu et al. | |
| 2021/0313891 A1 * | 10/2021 | Chakraborty | H02M 1/0095 |
| 2022/0190738 A1 * | 6/2022 | Chen | H02M 1/4233 |

(Continued)

FOREIGN PATENT DOCUMENTS

| | | |
|---|---|---|
| CN | 112615553 A | 4/2021 |
| EP | 3320607 B1 | 3/2020 |

OTHER PUBLICATIONS

European Patent Office; Extended European Search Report to Corresponding Application No. 22213612.9-1202; May 4, 2023; 11 Pages.

*Primary Examiner* — Gustavo A Rosario-Benitez
(74) *Attorney, Agent, or Firm* — Cooper Legal Group LLC

(57) ABSTRACT

A multi-level converter comprises one or more flying capacitors configured to operate at balanced voltages. The multi-level converter comprises a plurality of switching groups comprising pairs of switches operable to transfer energy to and from an inductor and the one or more flying capacitors for inverting an input voltage to an inverted output voltage. The multi-level converter comprises the inductor configured to operate according to an inductor frequency greater than a switching frequency used to control the plurality of switching groups.

20 Claims, 7 Drawing Sheets

(56) References Cited

U.S. PATENT DOCUMENTS

2023/0041194 A1* 2/2023 Tang .................... H02M 3/1584
2023/0058431 A1* 2/2023 Yun ....................... H02M 3/158
2024/0030856 A1* 1/2024 Smolenaers ............ B60L 50/60

* cited by examiner

MULTI-LEVEL INVERTING BUCK-BOOST CONVERTER ARCHITECTURE

TECHNICAL FIELD

The present disclosure relates to the field of inverting buck-boost converters for inverting an input voltage to generate an inverted output voltage.

BACKGROUND

Many technology areas utilize conventional isolated three-wire architectures as a power supply topology. Recently, some technology areas such as 5G telecom technology are transitioning to non-isolated two wire architectures to replace the isolated three-wire architecture. With the non-isolated two wire architecture, the input supply rail has a negative voltage, while the output voltage is positive.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a multi-level converter is provided. The multi-level converter comprises a flying capacitor configured to operate at a balanced voltage less than a combination of an input voltage and an inverted output voltage of the multi-level converter. The multi-level converter comprises a plurality of switching groups comprising pairs of switches. One or more of the plurality of switching groups are operable to transfer energy to and from an inductor and the flying capacitor for inverting the input voltage to the inverted output voltage. The plurality of switching groups comprises a first switching group comprising a first pair of switches having a first switch driven by a first driving signal and a second switch driven by a second driving signal that is complementary to the first driving signal. The plurality of switching groups comprises a second switching group comprising a second pair of switches having a third switch driven by a third driving signal and a fourth switch driven by a fourth driving signal that is complementary to the third driving signal. The multi-level converter comprises the inductor configured to operate according to an inductor frequency greater than a switching frequency used to control the plurality of switching groups.

In an embodiment of the techniques presented herein, a method is provided. The method includes operating a flying capacitor at a balanced voltage less than a combination of an input voltage and an inverted output voltage of a multi-level converter. The method includes operating a plurality of switching groups comprising pairs of switches. One or more of the plurality of switching groups are operable to transfer energy to and from an inductor and the flying capacitor for inverting the input voltage to the inverted output voltage. The plurality of switching groups comprises at least a first switching group comprising a first pair of switches having a first switch driven by a first driving signal and a second switch driven by a second driving signal that is complementary to the first driving signal; and a second switching group comprising a second pair of switches having a third switch driven by a third driving signal and a fourth switch driven by a fourth driving signal that is complementary to the third driving signal. The method includes operating the inductor according to an inductor frequency greater than a switching frequency used to control the plurality of switching groups.

In an embodiment of the techniques presented herein, an apparatus is provided. The apparatus includes means for operating a flying capacitor at a balanced voltage less than a combination of an input voltage and an inverted output voltage of a multi-level converter. The apparatus comprises means for operating a plurality of switching groups comprising pairs of switches. One or more of the plurality of switching groups are operable to transfer energy to and from an inductor and the flying capacitor for inverting the input voltage to the inverted output voltage. The plurality of switching groups comprises at least a first switching group comprising a first pair of switches having a first switch driven by a first driving signal and a second switch driven by a second driving signal that is complementary to the first driving signal; and a second switching group comprising a second pair of switches having a third switch driven by a third driving signal and a fourth switch driven by a fourth driving signal that is complementary to the third driving signal. The apparatus comprises means for operating the inductor according to an inductor frequency greater than a switching frequency used to control the plurality of switching groups.

In an embodiment of the techniques presented herein, a multi-level converter is provided. The multi-level converter comprises a first input voltage rail connected to a first output voltage rail in common with a first terminal of an inductor. The multi-level converter comprises a first plurality of series connected switches connected between a second input voltage rail and a second terminal of the inductor. The multi-level converter comprises a second plurality of series connected switches connected between a second output voltage rail and a the second terminal of the inductor, wherein the first plurality of series connected switches and second plurality of series connected switches form a plurality of switching groups. The multi-level converter comprises a plurality of flying capacitors connected between the plurality of switching groups. The multi-level converter comprises a plurality of pulse width modulators configured to operate the first plurality of series connected switches and the second plurality of series connected switches to invert an input voltage to an inverted output voltage.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
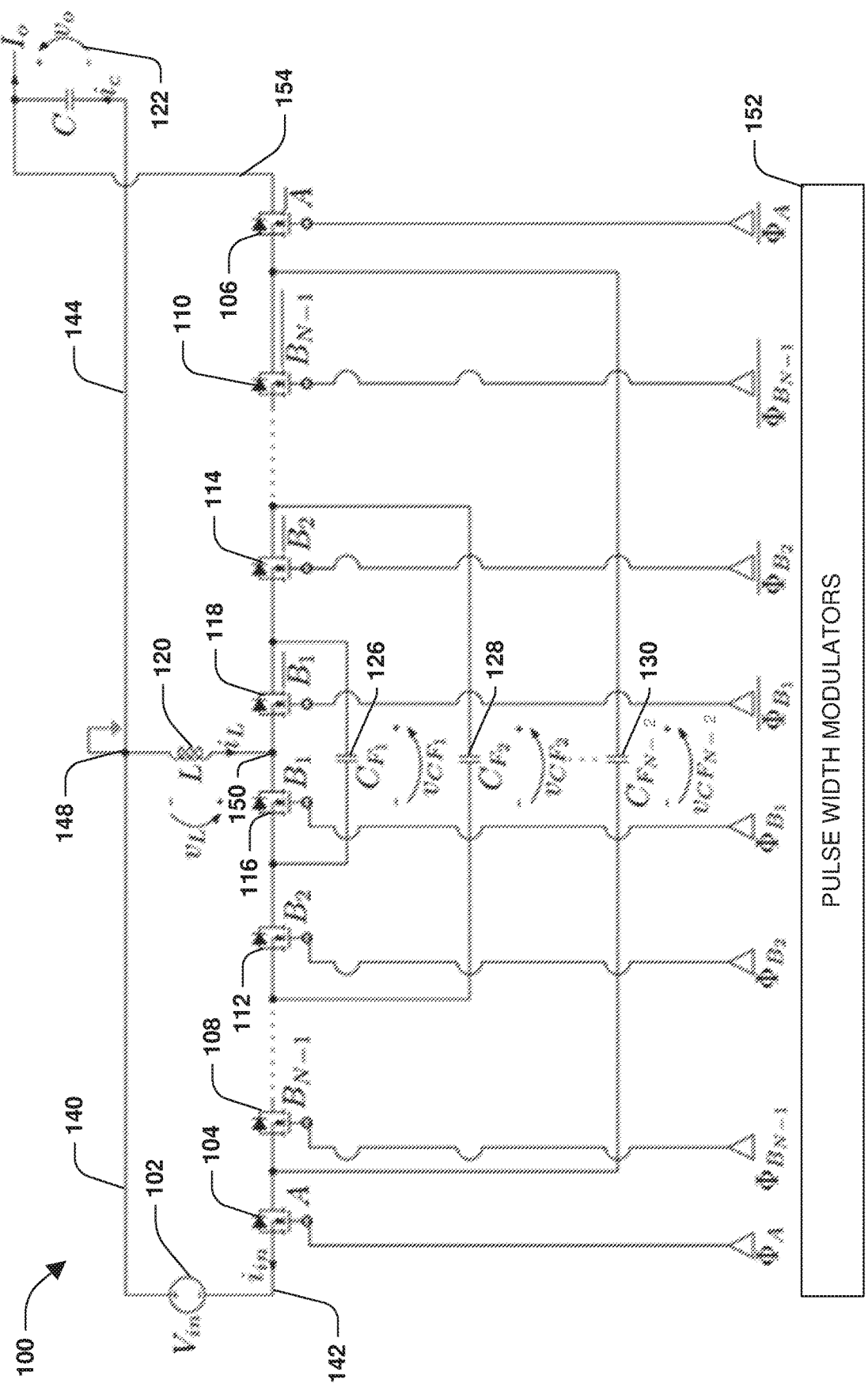
FIG. 1 is a schematic diagram illustrating an N-level converter for inverting an input voltage into an inverted output voltage in accordance with one or more of the techniques presented herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Some electronic devices utilize a non-isolated two wire architecture as a power supply topology. With this power supply topology, a converter may be used to convert an input voltage to an output voltage. For example, a two-switch inverting buck-boost converter may be configured to generate the output voltage having an inverted polarity that is opposite a polarity of the input voltage, such as where a positive output voltage is generated from a negative input voltage. The two-switch inverting buck-boost converter comprises two switches that are driven in a complementary fashion with a dead-time imposed in order to prevent shoot through. With the two-switch inverting buck-boost converter being single stage, a voltage stress across the pair of switches is equal to the output voltage plus the absolute value of the input voltage. Furthermore, the two-switch inverting buck-boost converter requires larger inductors compared to any other non-inverting variant running with the same absolute input and output voltages.

Alternatively, a two-stage solution for voltage conversion may be implemented where one stage performs the inversion of the input voltage to the output voltage, while the other stage controls the output voltage. However, the architecture is complicated and results in losses at each storage in order to comply with target system efficiency.

In order to address these limitations of the two-switch inverting buck-boost converter and the two-stage variant, a multi-level buck-boost converter is provided. The multi-level buck-boost converter is configured to generate an inverted output voltage from an input voltage of an input voltage rail in one stage. The multi-level buck-boost converter has N number of levels (stages), such as 3 or more levels. With this multi-level buck-boost converter, a reduction in inductor size is achieved by a factor of $$\frac{1}{(N-1)^2}$$

compared to the two-switch inverting buck-boost converter that is a two level system. Furthermore, voltage stress across switches is reduced by a factor of $$\frac{1}{N-1},$$

which enables the use or lower voltage switches that have lower switching losses and higher efficiency compared to prior architectures/topologies.

FIG. 1 illustrates a multi-level converter such as a multi-level buck-boost converter 100 with N levels. It may be appreciated that the multi-level buck-boost converter 100 may comprise any number of levels, such as 3 or more levels. The multi-level buck-boost converter 100 comprises (N−2) interconnected flying capacitors, such as a flying capacitor $CF_1$ 126, a flying capacitor $CF_2$ 128, and/or any other number of flying capacitors through flying capacitor $CF_{N-2}$ 130. The multi-level buck-boost converter 100 comprises an inductor L 120. The multi-level buck-boost converter 100 comprises 2(N−1) switches. The 2(N−1) switches are broken down into (N−1) switching groups. A front-end switching group A-$\bar{A}$, comprising a switch A 104 and a switch $\bar{A}$ 106, is connected to an input voltage rail 142 and an output voltage rail 154. The other switching groups are from switching group $B_1$-$\overline{B_1}$ comprising switch $B_1$ 116 and switch $\overline{B_1}$ 118 as an inner most switching group, to switching group $B_2$-$\overline{B_2}$ comprising switch $B_2$ 112 and switch $\overline{B_2}$ 114 as a next most inner switching group, and finally to switching group $B_{N-1}$-$\overline{B_{N-1}}$ comprising switch $B_{N-1}$ 108 and switch $\overline{B_{N-1}}$ 110 as an outer most switching group between the front-end switching group A-$\bar{A}$. Each switching group comprises two switches that are driven in a complementary fashion, and each switching group is $$\frac{2\pi}{N-1}$$

out of phase from the switching group before. In general, a standard inverting buck-boost topology has two modes of operation. A converter with this topology and operating with a duty cycle less than 0.5 has a step-down characteristic with voltage conversion ratio less than 1. However, a voltage conversion ratio greater than 1 can be obtained in a region with a duty cycle larger than 0.5. In contrast to the standard inverting buck-boost topology, the interleaved operation of the multi-level topology of the multi-level buck-boost converter 100 enables a total of N−1 operating modes depending on the duty cycle of the multi-level buck-boost converter 100. These N−1 operating modes include the two modes of the standard inverting buck-boost topology, along with one or more additional modes. The switching groups of the multi-level buck-boost converter 100 are operated according to an interleaved modulation scheme based multiple operating modes in order to invert an input voltage of an input source 102 to an inverted output voltage 122 having a reverse/opposite polarity as the input voltage. This interleaved modulation scheme applies to N-level buck-boost converters, and an embodiment of this interleaved modulation scheme as applied to a three-level buck-boost converter is described in further detail with respect to FIGS. 2A-2E and FIG. 3 for illustrative purposes. The inversion of the input voltage to generate the inverted output voltage 122 is achieved based upon the interleaved modulation scheme, intermediate voltages of the flying capacitors, and the multi-level architecture of the multi-level buck-boost converter 100.

In some embodiments, the multi-level buck-boost converter 100 comprises an input voltage rail 140 connected to an output voltage rail 144 in common with a first terminal 148 of the inductor L 120. The multi-level buck-boost converter 100 comprises a first plurality of series connected switches connected between the input voltage rail 142 and a second terminal 150 of the inductor L 120. The first plurality of series connected switches may comprise the switch A 104, the switch $B_{N-1}$ 108, the switch $B_2$ 112, the switch $B_1$ 116, and/or any other switches between the switch $B_{N-1}$ 108 and the switch $B_2$ 112. The multi-level buck-boost converter 100 comprises a second plurality of series connected switches connected between the output voltage rail 154 and the second terminal 150 of the inductor L 120. The second plurality of series connected switches may comprise the switch $\overline{B_1}$ 118, the switch $\overline{B_2}$ 114, the switch $\overline{B_{N-1}}$ 110, the switch $\overline{A}$ 106, and/or any other switches between the switch $\overline{B_2}$ 114 and the switch $\overline{B_{N-1}}$ 110. Switches within the first plurality of series connected switches and switches within the second plurality of series connected switches form a plurality of switching groups, such as N−1 switching groups where N is the number of levels of the multi-level buck-boost converter 100. The multi-level buck-boost converter 100 comprises the plurality of flying capacitors connected between the plurality of switching groups. In some embodiments, the inner most switching group, comprising the switch $B_1$ 116 and the switch $\overline{B_1}$ 118, are connected to the second terminal 150 of the inductor L 120 and the flying capacitor $CF_1$ 126. In some embodiments, the flying capacitor $CF_{N-2}$ 130 is connected between the switch A 104 and the switch $B_{N-1}$ 108 and between the switch $\overline{B_{N-1}}$ 110 and the switch $\overline{A}$ 106.

The multi-level buck-boost converter 100 comprises a plurality of pulse width modulators 152. The plurality of pulse width modulators 152 are configured to operate the first plurality of series connected switches and the second plurality of series connected switches in order to invert the input voltage to generate the inverted output voltage 122. For example, the switch $B_2$ 112 of the switching group $B_2$-$\overline{B_2}$ is operated with a gate signal $\varphi_{B2}$ matching a pulse width modulation signal. The switch $\overline{B_2}$ 114 of the switching group $B_2$-$\overline{B_2}$ is operated with a second gate signal $\overline{\varphi_{B2}}$ that is a complementary version of the pulse width modulation signal.

In some embodiments, a three-level variant of a multi-level converter is shown in FIGS. 2A-2E as a multi-level buck-boost converter 200. The multi-level buck-boost converter 200 has two switching groups, switching group A and switching group B. Each switching group has two switches. Switching group A has a switch A 204 and a switch $\overline{A}$ 206, and switching group B has a switch B 208 and a switch $\overline{B}$ 210. The switch A 204 and the switch $\overline{A}$ 206 are driven from complimentary gating signals $\varphi_A$ and $\overline{\varphi_A}$. Similarly, complimentary gating signals $\varphi_B$ and $\overline{\varphi_B}$ drive the switch B 208 and the switch $\overline{B}$ 210 of the switching group B.

The interleaved operation of the multi-level buck-boost converter 200 makes a flying capacitor $C_F$ 218 balanced at $$\frac{|V_{in}| + V_o}{2},$$

according to some embodiments. The inductance, used to provide the same inductor current ripple as the standard two-level converter running with the same switching frequency, is four times smaller in the three-level topology of the multi-level buck-boost converter 200. The output capacitance is load current dependent and an increase in the number of levels of the multi-level buck-boost converter 200 has no effect on a size of an output capacitor C 216. Therefore, for the same load current, the size of the output capacitor C 216 is the same for the standard two-level converter and this N-level architecture of the multi-level buck-boost converter 100 and the multi-level buck-boost converter 200. The multi-level buck-boost converter 200 with the three-level topology has two modes of operation. During the first mode of operation, the duty command D is less than 0.5 and a voltage conversion ratios is less than 1. When the multi-level buck-boost converter 200 enters the second mode of operation, the voltage conversion ratio is greater than 1 and the duty command D is greater than 0.5. The multi-level buck-boost converter 200 has four topological states, and how the modes of operation may change between these four topological states will be subsequently described in relation to FIGS. 2A-2E. With this topology, the absolute voltage variations across the inductor 212 is reduced by two times compared to the standard two-level converter. Meanwhile, for the same operating frequency, the current ripple frequency is twice the switching rate of the switches of the switching groups.

As an introduction to the methodology of operating the disclosed multi-level buck-boost converter, operation of a standard two-level converter upon which operation of the multi-level buck-boost converter builds is introduced. With the standard two-level converter, energy is transferred from an input source to a load through an inductor L and an output capacitor C. With the standard two-level converter, the energy transfer is occurring with only two topological states and between two voltage levels, −Vin and Vo. The input source injects energy into the inductor L during a first topological state while the output capacitor C provides energy to the load. In a second topological state, the inductor L transfers the energy stored during the first topological state to the output capacitor C and the load. The output voltage depends on a time interval during which the input source injects the energy into the inductor L. Therefore, at duty command D=0.5, the time interval of charging the inductor L equals a discharge time, which results in a voltage conversion ratio M=1. Accordingly, the step-down operating range is D<0.5, while the standard two-level converter is boosting the voltage with D>0.5.

Figure 2A:
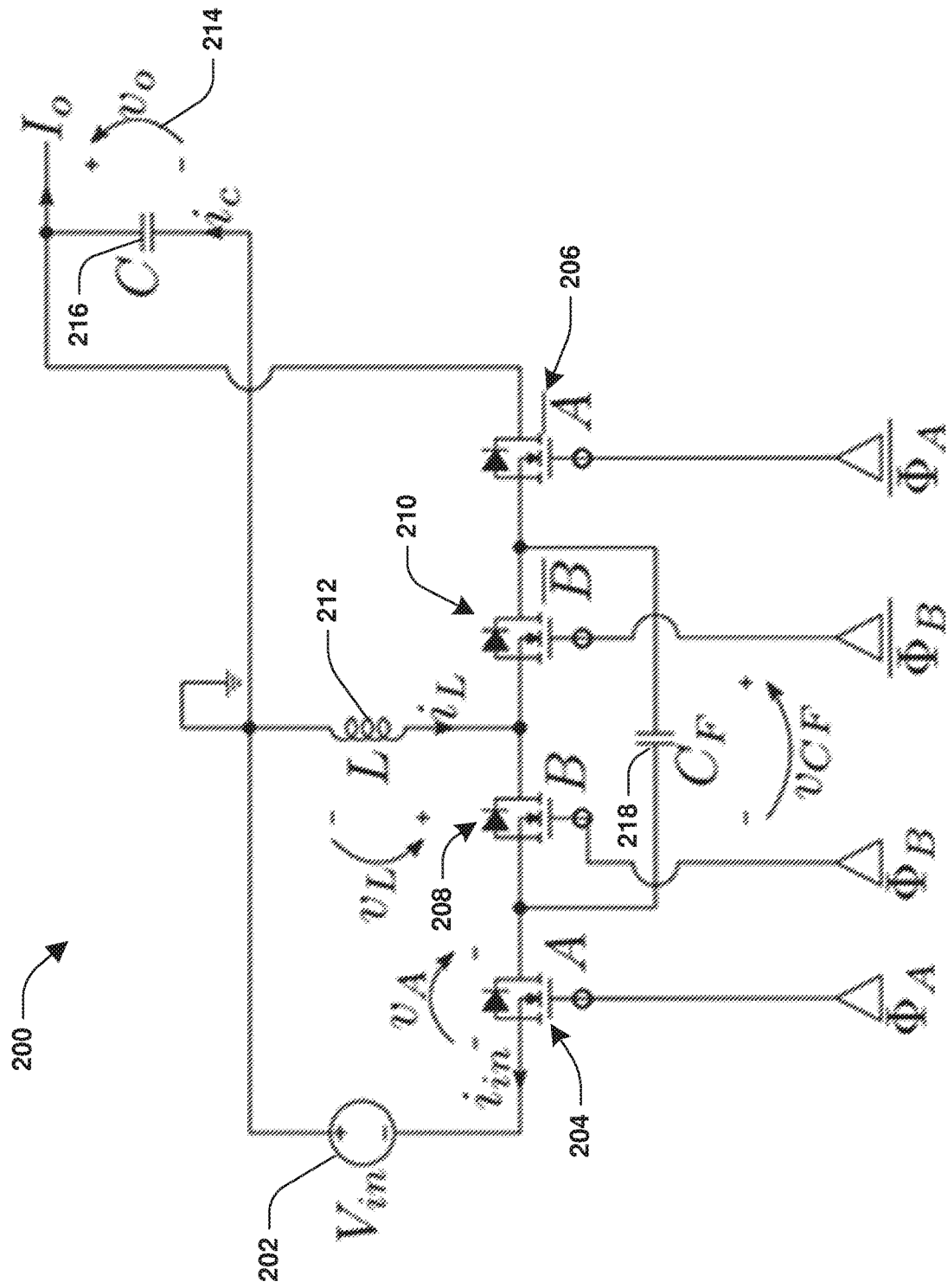
FIG. 2A is a schematic diagram illustrating a three-level converter for inverting an input voltage into an inverted output voltage in accordance with one or more of the techniques presented herein.

With the disclosed multi-level buck-boost converter having the multilevel topology, intermediate topological states are provided in additional to the two topological states of the standard two-level converter. The intermediate topological states of the multi-level buck-boost converter are provided by utilizing flying capacitors and extra switching elements (switches). The energy flow within the flying capacitors of the multi-level buck-boost converter depends on a voltage conversion ratio of the multi-level buck-boost converter. For the sake of simplicity, the multi-level buck-boost converter 200 of FIG. 2A is a three-level variant of the multi-level buck-boost converter, and topological states of this three-level variant are described in conjunction with FIGS. 2B-2E, however, a multi-level buck-boost converter can have any number of levels beyond three.

Figure 2B:
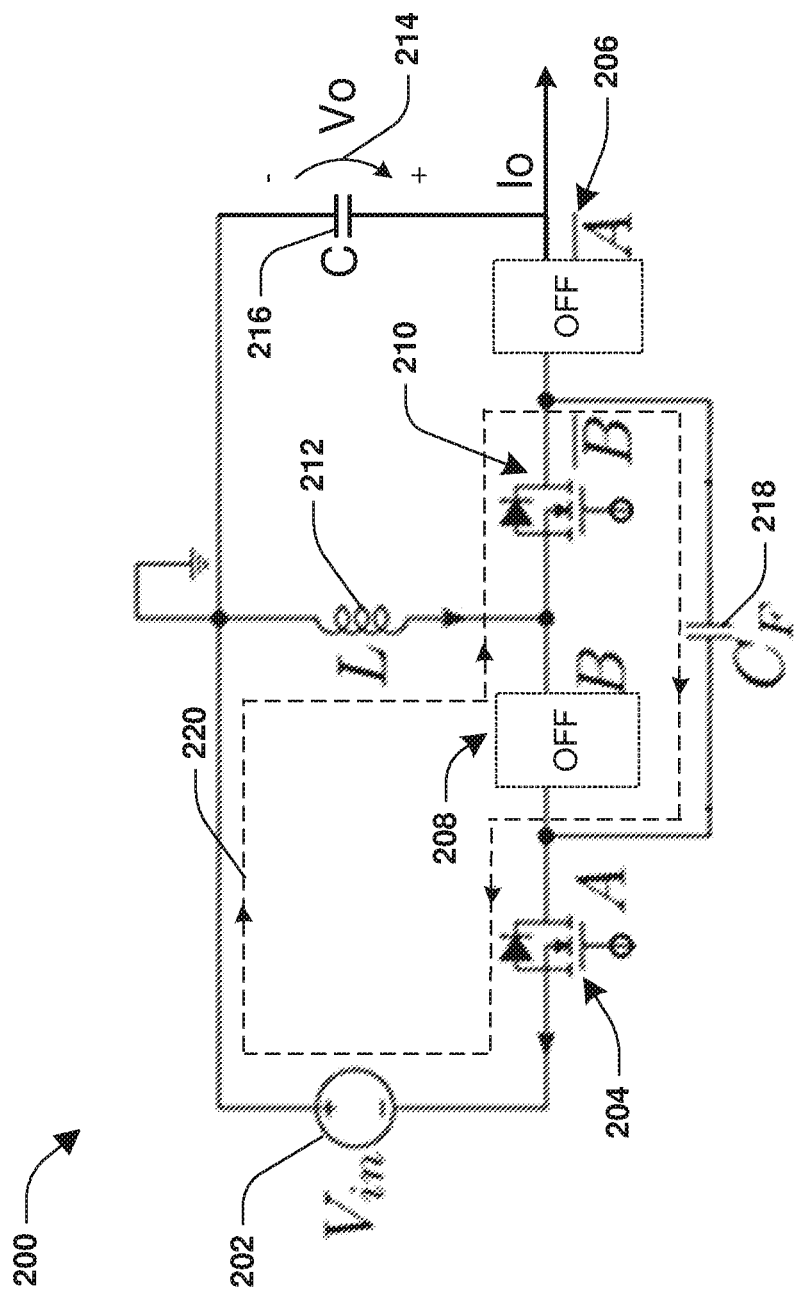
FIG. 2B is a schematic diagram illustrating a multi-level converter operating according to a first topological state for inverting an input voltage into an inverted output voltage in accordance with one or more of the techniques presented herein.
Figure 2C:
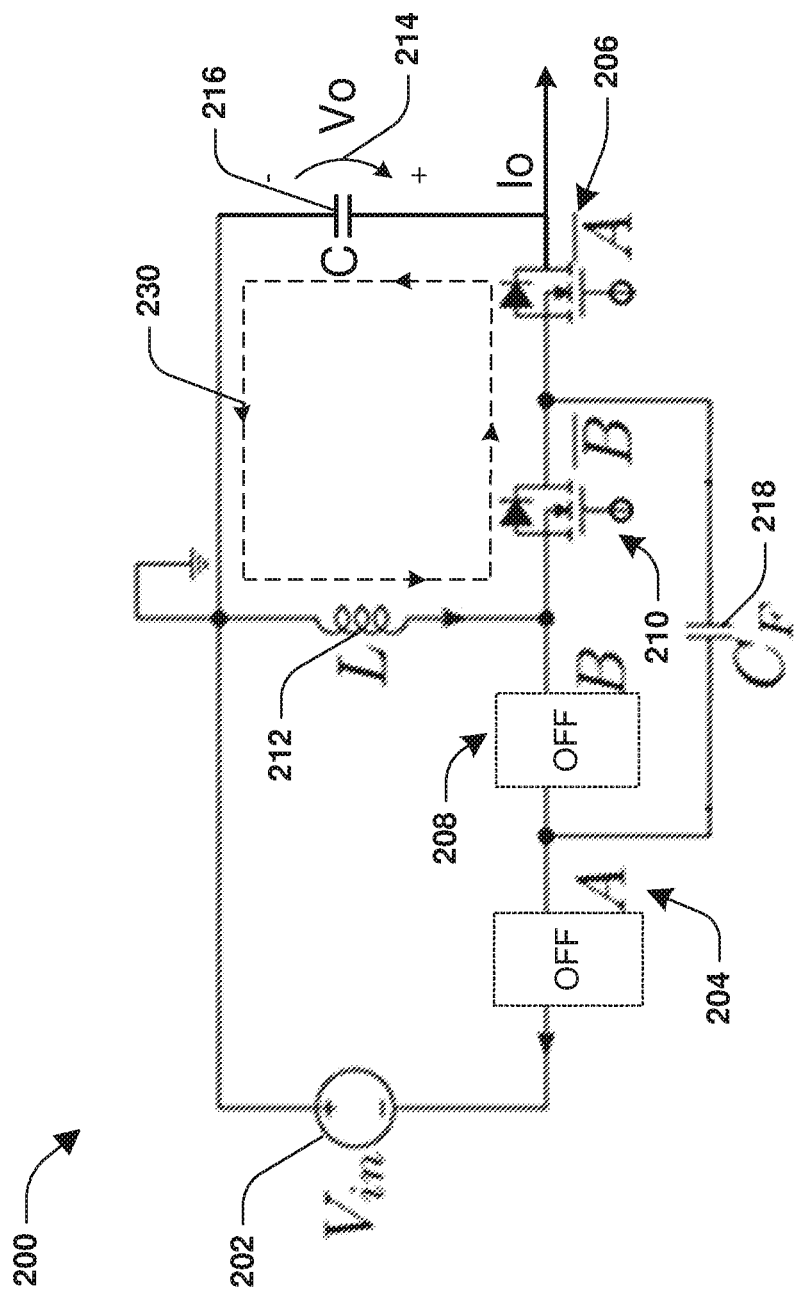
FIG. 2C is a schematic diagram illustrating a multi-level converter operating according to a second topological state for inverting an input voltage into an inverted output voltage in accordance with one or more of the techniques presented herein.
Figure 2D:
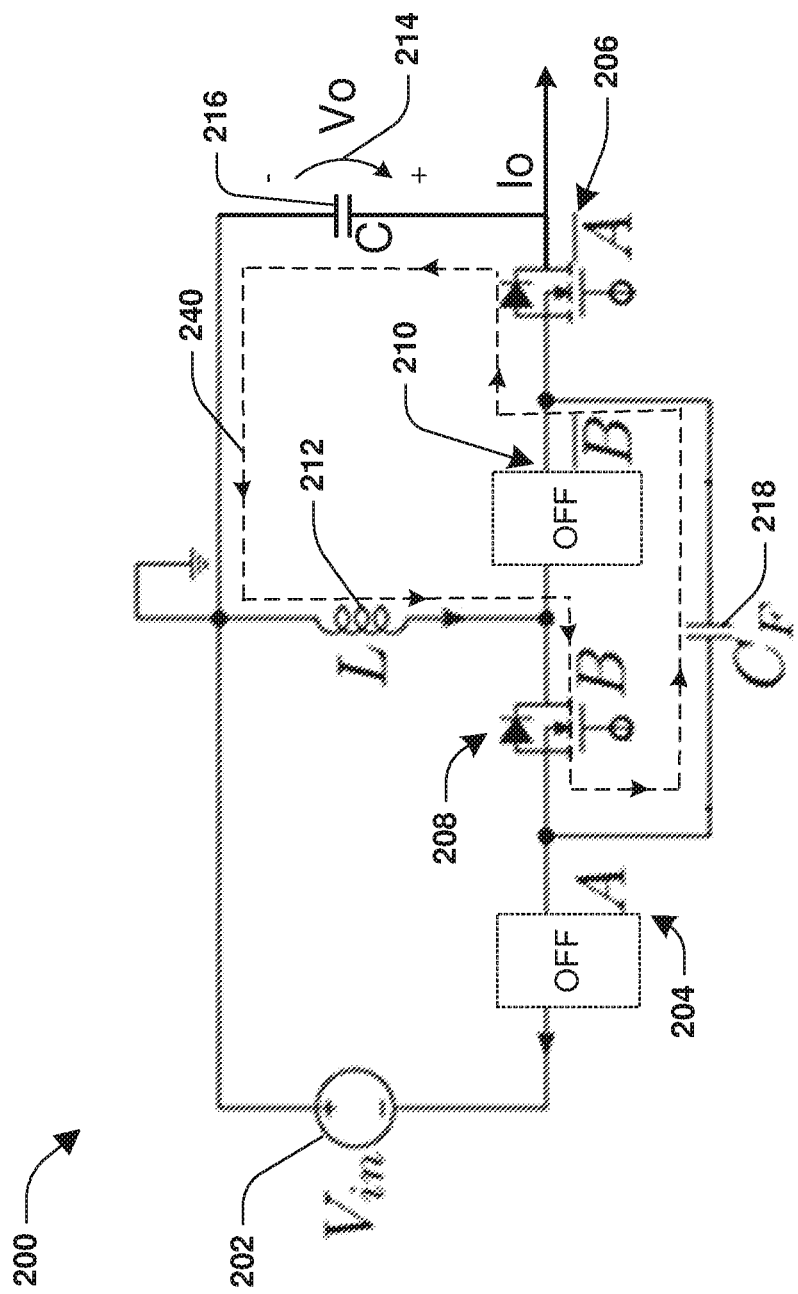
FIG. 2D is a schematic diagram illustrating a multi-level converter operating according to a third topological state for inverting an input voltage into an inverted output voltage in accordance with one or more of the techniques presented herein.

FIG. 2B depicts a first topological state of the three-level variant of the multi-level buck-boost converter 200. With the first topological state, an operating region has a voltage transfer ratio M<1 (buck mode), and an input source 202 transfers 220 energy to the inductor L 212 and the flying capacitor $C_F$ 218 while a load is powered by an output capacitor C 216. FIG. 2C depicts a second topological state of the three-level variant of the multi-level buck-boost converter 200. With the second topological state, the inductor L 212 injects 230 the stored energy into the load and the output capacitor C 216 while the flying capacitor $C_F$ 218 is floating. FIG. 2D depicts a third topological state of the three-level variant of the multi-level buck-boost converter 200. With the third topological state, the flying capacitor $C_F$ 218 transfers 240 stored energy (e.g., energy stored during the first topological state) into the inductor 212, the output capacitor C 216, and the load. Finally, the second topological state of FIG. 2C is repeated where the inductor L 212 discharges into the load and the output capacitor C 216 to complete a switching cycle.

Figure 2E:
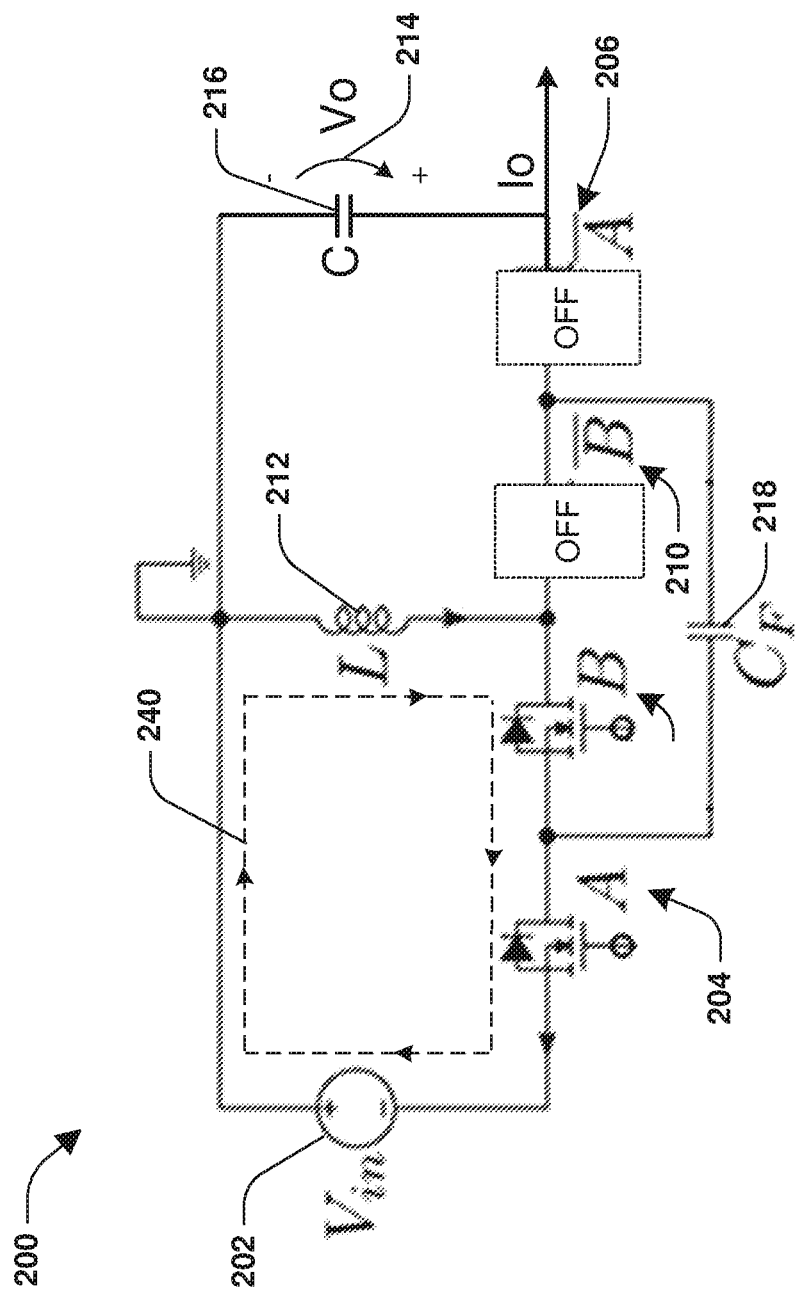
FIG. 2E is a schematic diagram illustrating a multi-level converter operating according to a fourth topological state for inverting an input voltage into an inverted output voltage in accordance with one or more of the techniques presented herein.

FIG. 2E illustrates a fourth topological state of the three-level variant of the multi-level buck-boost converter 200. With the fourth topological state, an operating region has a voltage conversion ratio M>1 (boost mode). The fourth topological state takes a repetitive role as opposed to the second topological state of FIG. 2C. For example, the input source 202 starts charging 240 the inductor L 212 during the fourth topological state. Then, the modulation scheme forces the multi-level buck-boost converter 200 to enter the first topological state where the inductor L 212 and the input source 202 transfer energy to the flying capacitor $C_F$ 218. In this operating mode, the voltage of the flying capacitor $C_F$ 218 is higher than the voltage of the input source 202. After, the fourth topological state repeats the energy transfer from the input source 202 to the inductor L 212. During the fourth topological state and the first topological state, the output capacitor C 216 delivers the output power. Eventually, the multi-level buck-boost converter 200 completes the switching cycle with the third topological state of FIG. 2D where the inductor L 212 and the flying capacitor $C_F$ 218 both transfer energy to the load and the output capacitor C 216.

In some embodiments, for an operating mode with M≤1, energy is transferred from the input to the output as follows: 1) energy is transferred from the input source 202 to the inductor L 212 and the flying capacitor $C_F$ 218, 2) energy is transferred from the inductor L 212 to the output capacitor C 216 and the load, 3) energy is transferred from the flying capacitor $C_F$ 218 to the inductor L 212, the output capacitor C 216, and the load, and 4) energy is transferred from the inductor L 212 to the output capacitor C 216 and the load. In contrast, during boost mode where M>1, energy is transferred from the input to the output as follows: 1) energy is transferred from the input source 202 to the inductor L 212, 2) energy is transferred from the input source 202 and the inductor L 212 to the flying capacitor $C_F$ 218, 3) energy is transferred from the input source 202 to the inductor L 212, and 4) energy is transferred from the flying capacitor $C_F$ 218 and the inductor L 212 to the output capacitor C 216 and the load.

In general, the (N−2) flying capacitors of the N-level architecture each contributes energy transfer from an input source to the load in all modes of operation. The behavior of each flying capacitor and its interaction with energy flow of the inductor L and the other capacitors depends on the topological states of the multi-level converter and the voltage conversion ratio M. As previously described in relation to the three-level variant, energy is transferred from the input source 202 to both the inductor L 212 and the flying capacitor $C_F$ 218 during the first topological state in mode M<1. However, both the input source 202 and the inductor L 212 transfer energy to the flying capacitor $C_F$ 218 in the same topological state in the boost mode M>1. Moreover, the energy transfer may be in normal or any resonant form, although, with resonant form some additional topological states may occur due to the resonant behavior.

Figure 3:
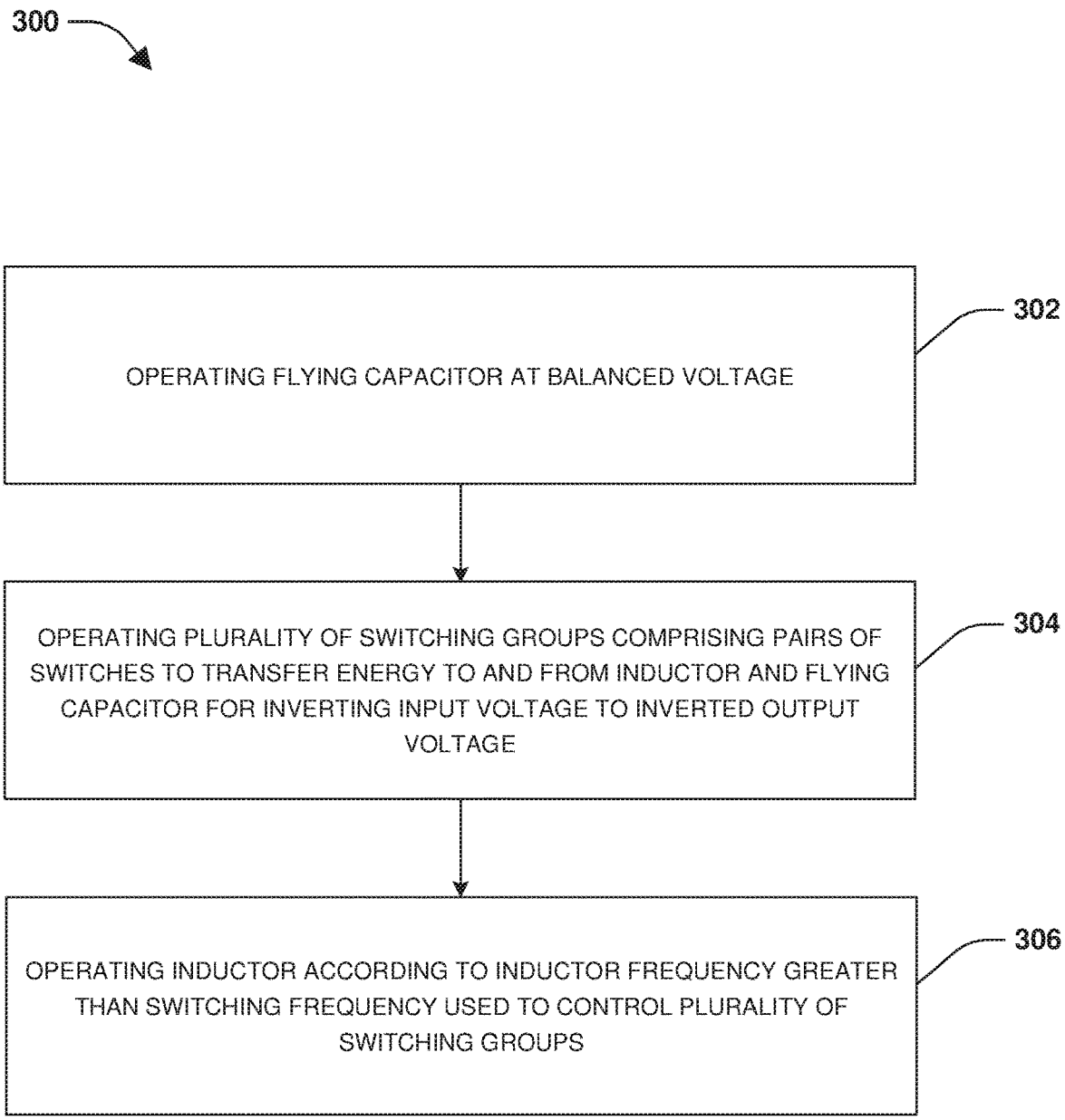
FIG. 3 is an illustration of an example method of controlling a multi-level converter in accordance with one or more of the techniques presented herein.

FIG. 3 illustrates a method 300 for operating a multi-level converter, such as the multi-level buck-boost converter 100 of FIG. 1 and/or the multi-level buck-boost converter 200 of FIGS. 2A-2E. It may be appreciated that even though method 300 will be discussed in relation to the multi-level buck-boost converter 200 for illustrative purposes in the context of the three-level variant, the method 300 may apply to an N-level buck-booster converter with any number of levels. The method 300 is implemented to operate the multi-level buck-boost converter 200 in order to invert an input voltage of the input source 202 to an inverted output voltage 214 having an inverted polarity opposite a polarity of the input voltage. The input voltage is inverted to generate the inverted output voltage 214 based upon a multi-level topology of the multi-level buck-boost converter 200. This inversion of the input voltage to generate the inverted output voltage 214 is due to the intermediate voltages of the flying capacitor $C_F$ 218 and the implementation of an interleaved modulation scheme used to open and close the switch A 204 the switch $\bar{A}$ 206 of the switching group A and the switch B 208 and the switch $\bar{B}$ 210 of the switching group B.

During operation 302 of the method 300, the flying capacitor $C_F$ 218 is operated at a balanced voltage. The balanced voltage is less than a combination of the input voltage and the inverted output voltage 214 of the multi-level buck-boost converter 200. During operation 304 of the method 300, the switch A 204 and the switch $\bar{A}$ 206 of the switching group A and the switch B 208 and the switch $\bar{B}$ 210 of the switching group B are operated (opened and closed) according to the interleaved modulation scheme. The switch $\bar{A}$ 204 of the switching group A is driven by a first driving signal and the switch A 206 of the switching group A is driven by a second driving signal that is complementary to the first driving signal. The switch B 208 of the switching group B is driven by a third driving signal and the switch $\bar{B}$ 210 of the switching group B is driven by a fourth driving signal that is complementary to the third driving signal. The first driving signal and the third driving signal are out of phase by 180 degrees. When one or more switches are off, a voltage across the one or more switches is less than a combination of the input voltage and the inverted output voltage.

When a duty cycle is less than a threshold such as where D<0.5, then the switching group A and the switching group B operate according to a first mode of operation. When the duty cycle is greater than the threshold such as where D>0.5, then the switching group A and the switching group B operate according to a second mode of operation. While in the first mode of operation, the multi-level buck-boost converter 200 starts at a first topological state, as illustrated by FIG. 2B. While in the first topological state, the switch A 204 and the switch $\bar{B}$ 210 are turned on (closed) and the switch $\bar{A}$ 206 and the switch B 208 are turned off (opened). It may be appreciated that when any switch is turned off by a turn off action, a dead time is implemented before a turn on action is performed to turn on a following switch. The input source 202 transfers energy to the inductor L 212 and the flying capacitor $C_F$ 218 while the load is powered by the output capacitor C 216. While in the first mode of operation, the multi-level buck-boost converter 200 next transitions from the first topological state to the second topological state, as illustrated by FIG. 2C. While in the second topological state, the switch A 204 and the switch B 208 are turned off (opened) and the switch $\bar{A}$ 206 and the switch $\bar{B}$ 210 are turned on (closed). With the second topological state, the inductor L 212 injects 230 the stored energy into the load and the output capacitor C 216 while the flying capacitor $C_F$ 218 is floating. While in the first mode of operation, the multi-level buck-boost converter 200 next transitions from the second topological state to the third topological state, as illustrated by FIG. 2D. While in the third topological state, the switch A 204 and the switch $\bar{B}$ 210 are turned off (opened) and the switch $\bar{A}$ 206 and the switch B 208 are turned on (closed). With the third topological state, the flying capacitor $C_F$ 218 transfers 240 stored energy (e.g., energy stored during the first topological state) into the inductor L 212, the output capacitor C 216, and the load. Finally, the second topological state of FIG. 2C is repeated where the inductor L 212 discharges into the load and the output capacitor C 216 to complete a switching cycle.

With the second mode of operation where the duty cycle D is greater than 0.5, there is a fourth topological state, illustrated by FIG. 2E. While in the fourth topological state, the switch A 204 and the switch B 208 are turned on (closed) and the switch $\bar{A}$ 206 and the switch $\bar{B}$ 210 are turned off (opened). With the fourth topological state, the input source 202 starts charging the inductor L 212. Then, the modulation scheme forces the multi-level buck-boost converter 200 to enter the first topological state where the inductor L 212 and the input source 202 transfer energy to the flying capacitor $C_F$ 218. In this operating mode, the voltage of the flying capacitor $C_F$ 218 is higher than the voltage of the input source 202. After, the fourth topological state repeats the energy transfer from the input source 202 to the inductor L 212. During the fourth topological state and the first topological state, the output capacitor C 216 delivers the output power. Eventually, the multi-level buck-boost converter 200 completes the switching cycle with the third topological state where the inductor L 212 and the flying capacitor $C_F$ 218 both transfer energy to the load and the output capacitor C 216.

During operation 306 of the method 300, the inductor is operated according to an inductor frequency. The inductor frequency is greater than a switching frequency used to control the switching group A and the switching group B. In some embodiments, the inductor frequency is a factor of N-1 of the switching frequency, where N is the number of levels of the multi-level buck-boost converter 100.

An embodiment of the presently disclosed techniques comprises a multi-level converter. The multi-level converter comprises a flying capacitor configured to operate at a balanced voltage less than a combination of an input voltage and an inverted output voltage of the multi-level converter; a plurality of switching groups comprising pairs of switches, wherein one or more of the plurality of switching groups are operable to transfer energy to and from an inductor and the flying capacitor for inverting the input voltage to the inverted output voltage, wherein the plurality of switching groups comprises: a first switching group comprising a first pair of switches having a first switch driven by a first driving signal and a second switch driven by a second driving signal that is complementary to the first driving signal; and a second switching group comprising a second pair of switches having a third switch driven by a third driving signal and a fourth switch driven by a fourth driving signal that is complementary to the third driving signal; and the inductor configured to operate according to an inductor frequency greater than a switching frequency used to control the plurality of switching groups.

According to some embodiments, the first driving signal and the third driving signal are out of phase by 180 degrees.

According to some embodiments, the first switching group and the second switching group operate according to a first mode based upon a duty cycle being less than a threshold and a second mode based upon the duty cycle being greater than the threshold.

According to some embodiments, the first mode comprises a first topology state that transitions to a second topology state that transitions to a third topology state that transitions to the second topology state, wherein during the first topology state, the first switch and the fourth switch are turned on and the energy is transferred from a source to the inductor and the flying capacitor.

According to some embodiments, during the second topology state, the first switch is turned off and the second switch is turned on and the energy is transferred from the inductor to an output capacitor and a load.

According to some embodiments, during the third topology state, a turn off action is performed to turn off the energy transfer, a dead time is implemented, and then a turn on action is performed where the third switch is turned on and the fourth switch is turned off and the energy is transferred from the flying capacitor to the inductor, an output capacitor, and a load.

According to some embodiments, during the third topology state, the fourth switch is turned off and the third switch is turned on and the energy is transferred from the flying capacitor to the inductor, an output capacitor, and a load.

According to some embodiments, the second mode comprises a first topology state that transitions to a second topology state that transitions to the first topology state that transitions to a third topology state, wherein during the first topology state, the first switch and the third switch are turned on and the energy is transferred from a source to the inductor.

According to some embodiments, during the second topology state, the first switch and the fourth switch are turned on and the energy is transferred from the source and the inductor to the flying capacitor.

According to some embodiments, the third topology state is transitioned to after a repeat occurrence of the first topology state, and wherein during the third topology state, the first switch is turned off and the second switch is turned on and the energy is transferred from the flying capacitor and the inductor to an output capacitor and a load.

According to some embodiments, the inverted output voltage has an inverted polarity opposite a polarity of the input voltage.

According to some embodiments, a voltage across active switches of the plurality of switches is less than the combination of the input voltage and the inverted output voltage of the multi-level converter.

According to some embodiments, the inductor frequency is a factor of N-1 of the switching frequency, wherein N is a number of levels of the multi-level converter, and wherein the multi-level converter comprises N-1 switching groups as the plurality of switching groups.

According to some embodiments, the plurality of switching groups are opened and closed according to an interleaved modulation scheme for inverting the input voltage to the inverted output voltage based upon an intermediate voltage of the flying capacitor.

An embodiment of the presently disclosed techniques comprises a method. The method comprises operating a flying capacitor at a balanced voltage less than a combination of an input voltage and an inverted output voltage of a multi-level converter; operating a plurality of switching groups comprising pairs of switches, wherein one or more of the plurality of switching groups are operable to transfer energy to and from an inductor and the flying capacitor for inverting the input voltage to the inverted output voltage, wherein the plurality of switching groups comprises at least: a first switching group comprising a first pair of switches having a first switch driven by a first driving signal and a second switch driven by a second driving signal that is complementary to the first driving signal; and a second switching group comprising a second pair of switches having a third switch driven by a third driving signal and a fourth switch driven by a fourth driving signal that is complementary to the third driving signal; and operating the inductor according to an inductor frequency greater than a switching frequency used to control the plurality of switching groups.

According to some embodiments, the method comprises opening and closing the plurality of switching groups according to an interleaved modulation scheme to invert the input voltage to the inverted output voltage based upon an intermediate voltage of the flying capacitor.

According to some embodiments, the plurality of switching groups comprises one or more additional switching groups associated with one or more additional flying capacitors.

An embodiment of the presently disclosed techniques comprises an apparatus, comprising means for operating a flying capacitor at a balanced voltage less than a combination of an input voltage and an inverted output voltage of a multi-level converter; means for operating a plurality of switching groups comprising pairs of switches, wherein one or more of the plurality of switching groups are operable to transfer energy to and from an inductor and the flying capacitor for inverting the input voltage to the inverted output voltage, wherein the plurality of switching groups comprises: a first switching group comprising a first pair of switches having a first switch driven by a first driving signal and a second switch driven by a second driving signal that is complementary to the first driving signal; and a second switching group comprising a second pair of switches having a third switch driven by a third driving signal and a fourth switch driven by a fourth driving signal that is complementary to the third driving signal; and means for operating the inductor according to an inductor frequency greater than a switching frequency used to control the plurality of switching groups.

An embodiment of the presently disclosed techniques comprises a multi-level converter. The multi-level converter comprises a first input voltage rail connected to a first output voltage rail in common with a first terminal of an inductor; a first plurality of series connected switches connected between a second input voltage rail and a second terminal of the inductor; a second plurality of series connected switches connected between a second output voltage rail and the second terminal of the inductor, wherein the first plurality of series connected switches and second plurality of series connected switches form a plurality of switching groups; a plurality of flying capacitors connected between the plurality of switching groups; and a plurality of pulse width modulators configured to operate the first plurality of series connected switches and the second plurality of series connected switches to invert an input voltage to an inverted output voltage.

According to some embodiments, the first plurality of series connected switches and the second plurality of series connected switches form N−1 switching groups, where N is a number of levels of the multi-lever converter.

According to some embodiments, an inner switching group of two switches is connected to a terminal of the inductor and a flying capacitor.

According to some embodiments, a first switch of a switching group is operated with a first gate signal matching a pulse width modulation signal, and wherein a second switch of the switching group is operated with a second gate signal that is a complementary version of the pulse width modulation signal.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A multi-level converter comprising:
   a flying capacitor configured to operate at a balanced voltage less than a combination of an input voltage and an inverted output voltage of the multi-level converter;
   a plurality of switching groups comprising pairs of switches, wherein one or more of the plurality of switching groups are operable to transfer energy to and from an inductor and the flying capacitor for inverting the input voltage to the inverted output voltage, wherein the plurality of switching groups comprises:
   a first switching group comprising a first pair of switches having a first switch driven by a first driving signal and a second switch driven by a second driving signal that is complementary to the first driving signal; and
   a second switching group comprising a second pair of switches having a third switch driven by a third driving signal and a fourth switch driven by a fourth driving signal that is complementary to the third driving signal, wherein the first switching group and the second switching group operate according to a first mode based upon a duty cycle being less than a threshold and a second mode based upon the duty cycle being greater than the threshold, wherein at least one of the first mode or the second mode is a boost mode; and
   the inductor, of the multi-level converter, configured to operate according to an inductor frequency greater than a switching frequency used to control the plurality of switching groups of the multi-level converter,
   wherein at least one of:
      the first mode comprises a first topology state that transitions to a second topology state that transitions to a third topology state that transitions to the second topology state, wherein during the first topology state, the first switch and the fourth switch are turned on and the energy is transferred from a source to the inductor and the flying capacitor; or
      the second mode comprises a fourth topology state that transitions to a fifth topology state that transitions to the fourth topology state that transitions to a sixth topology state, wherein during the fourth topology state, the first switch and the third switch are turned on and the energy is transferred from the source to the inductor.

2. The multi-level converter of claim 1, wherein the first driving signal and the third driving signal are out of phase by 180 degrees.

3. The multi-level converter of claim 1, wherein at least one of the first mode or the second mode is a buck mode.

4. The multi-level converter of claim 1, wherein the first mode comprises the first topology state that transitions to the second topology state that transitions to the third topology state that transitions to the second topology state, wherein during the first topology state, the first switch and the fourth switch are turned on and the energy is transferred from the source to the inductor and the flying capacitor.

5. The multi-level converter of claim 4, wherein during the second topology state, the first switch is turned off and the second switch is turned on and the energy is transferred from the inductor to an output capacitor and a load.

6. The multi-level converter of claim 4, wherein during the third topology state, the fourth switch is turned off and the third switch is turned on and the energy is transferred from the flying capacitor to the inductor, an output capacitor, and a load.

7. The multi-level converter of claim 1, wherein the second mode comprises the fourth topology state that transitions to the fifth topology state that transitions to the fourth topology state that transitions to the sixth topology state, wherein during the fourth topology state, the first switch and the third switch are turned on and the energy is transferred from the source to the inductor.

8. The multi-level converter of claim 7, wherein during the fifth topology state, the first switch and the fourth switch are turned on and the energy is transferred from the source and the inductor to the flying capacitor.

9. The multi-level converter of claim 7, wherein the sixth topology state is transitioned to after a repeat occurrence of the fourth topology state, and wherein during the sixth topology state, the first switch is turned off and the second switch is turned on and the energy is transferred from the flying capacitor and the inductor to an output capacitor and a load.

10. The multi-level converter of claim 1, wherein the inverted output voltage has an inverted polarity opposite a polarity of the input voltage.

11. The multi-level converter of claim 1, wherein a voltage across active switches of the plurality of switching groups is less than the combination of the input voltage and the inverted output voltage of the multi-level converter.

12. The multi-level converter of claim 1, wherein the inductor frequency is a factor of N−1 of the switching frequency, wherein N is a number of levels of the multi-level converter, and wherein the multi-level converter comprises N−1 switching groups as the plurality of switching groups.

13. The multi-level converter of claim 1, wherein the plurality of switching groups are opened and closed according to an interleaved modulation scheme for inverting the input voltage to the inverted output voltage based upon an intermediate voltage of the flying capacitor.

14. A method, comprising:
operating a flying capacitor at a balanced voltage less than a combination of an input voltage and an inverted output voltage of a multi-level converter;
operating a plurality of switching groups comprising pairs of switches, wherein one or more of the plurality of switching groups are operable to transfer energy to and from an inductor and the flying capacitor for inverting the input voltage to the inverted output voltage, wherein the plurality of switching groups comprises at least:
a first switching group comprising a first pair of switches having a first switch driven by a first driving signal and a second switch driven by a second driving signal that is complementary to the first driving signal; and
a second switching group comprising a second pair of switches having a third switch driven by a third driving signal and a fourth switch driven by a fourth driving signal that is complementary to the third driving signal, wherein the first switching group and the second switching group operate according to a first mode based upon a value being less than a threshold and a second mode based upon the value being greater than the threshold, wherein at least one of the first mode or the second mode is a boost mode; and
operating the inductor, of the multi-level converter, according to an inductor frequency greater than a switching frequency used to control the plurality of switching groups of the multi-level converter,
wherein at least one of:
the first mode comprises a first topology state that transitions to a second topology state that transitions to a third topology state that transitions to the second topology state, wherein during the first topology state, the first switch and the fourth switch are turned on and the energy is transferred from a source to the inductor and the flying capacitor; or
the second mode comprises a fourth topology state that transitions to a fifth topology state that transitions to the fourth topology state that transitions to a sixth topology state, wherein during the fourth topology state, the first switch and the third switch are turned on and the energy is transferred from the source to the inductor.

15. The method of claim 14, comprising:
opening and closing the plurality of switching groups according to an interleaved modulation scheme to invert the input voltage to the inverted output voltage based upon an intermediate voltage of the flying capacitor.

16. The method of claim 14, wherein the plurality of switching groups comprises one or more additional switching groups associated with one or more additional flying capacitors.

17. A multi-level converter comprising:
a first input voltage rail connected to a first output voltage rail in common with a first terminal of an inductor;
a first plurality of series connected switches connected between a second input voltage rail and a second terminal of the inductor;
a second plurality of series connected switches, of the multi-level converter, connected between a second output voltage rail and the second terminal of the inductor of the multi-level converter, wherein the first plurality of series connected switches and the second plurality of series connected switches form a plurality of switching groups, wherein the plurality of switching groups operate according to a first mode based upon a duty cycle being less than a threshold and a second mode based upon the duty cycle being greater than the threshold, wherein at least one of the first mode or the second mode is a boost mode;
a plurality of flying capacitors connected between the plurality of switching groups; and
a plurality of pulse width modulators configured to operate the first plurality of series connected switches and the second plurality of series connected switches to invert an input voltage to an inverted output voltage,
wherein at least one of:
the first mode comprises a first topology state that transitions to a second topology state that transitions to a third topology state that transitions to the second topology state, wherein during the first topology state, a first switch and a second switch are turned on and energy is transferred from a source to the inductor and a flying capacitor; or
the second mode comprises a fourth topology state that transitions to a fifth topology state that transitions to the fourth topology state that transitions to a sixth topology state, wherein during the fourth topology state, the first switch and a third switch are turned on and the energy is transferred from the source to the inductor.

18. The multi-level converter of claim 17, wherein the first plurality of series connected switches and the second plurality of series connected switches form N−1 switching groups, where N is a number of levels of the multi-level converter.

19. The multi-level converter of claim 17, wherein an inner switching group, of the plurality of switching groups, is connected to a terminal of the inductor and a flying capacitor.

20. The multi-level converter of claim 17, wherein a fourth switch of a switching group is operated with a first gate signal matching a pulse width modulation signal, and wherein a fifth switch of the switching group is operated with a second gate signal that is a complementary version of the pulse width modulation signal.

* * * * *